(12) United States Patent
Ito

(10) Patent No.: US 7,841,623 B2
(45) Date of Patent: Nov. 30, 2010

(54) AIRBAG DEVICE

(75) Inventor: Hideichi Ito, Toyota (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 61 days.

(21) Appl. No.: 12/371,665

(22) Filed: Feb. 16, 2009

(65) Prior Publication Data

US 2009/0267326 A1 Oct. 29, 2009

(30) Foreign Application Priority Data

Feb. 15, 2008 (JP) ............................. 2008-034881

(51) Int. Cl.
B60R 21/23 (2006.01)
(52) U.S. Cl. .................... 280/743.2; 280/736
(58) Field of Classification Search ............. 280/743.2, 280/743.1, 736, 739
See application file for complete search history.

(56) References Cited

U.S. PATENT DOCUMENTS

| 5,762,367 | A | * | 6/1998 | Wolanin | 280/736 |
|---|---|---|---|---|---|
| 6,334,627 | B1 | * | 1/2002 | Heym et al. | 280/743.2 |
| 6,371,517 | B1 | * | 4/2002 | Webber et al. | 280/736 |
| 6,454,300 | B1 | * | 9/2002 | Dunkle et al. | 280/742 |
| 6,513,835 | B2 | * | 2/2003 | Thomas | 280/743.2 |
| 6,616,184 | B2 | * | 9/2003 | Fischer | 280/743.2 |
| 6,648,371 | B2 | * | 11/2003 | Vendely et al. | 280/739 |
| 6,749,217 | B2 | * | 6/2004 | Damian et al. | 280/734 |
| 6,832,778 | B2 | * | 12/2004 | Pinsenschaum et al. | 280/739 |
| 6,918,614 | B2 | * | 7/2005 | Ryan | 280/743.2 |
| 6,932,384 | B2 | * | 8/2005 | Waid et al. | 280/739 |
| 7,021,656 | B2 | * | 4/2006 | Okamoto et al. | 280/739 |
| 7,249,783 | B2 | * | 7/2007 | Parkinson et al. | 280/743.2 |
| 7,413,218 | B2 | * | 8/2008 | Ekdahl | 280/739 |
| 7,469,926 | B2 | * | 12/2008 | Lewis et al. | 280/736 |
| 7,490,854 | B2 | * | 2/2009 | Thomas | 280/739 |
| 7,591,482 | B2 | * | 9/2009 | Thomas et al. | 280/739 |
| 7,695,014 | B2 | * | 4/2010 | Parks et al. | 280/743.2 |
| 7,753,405 | B2 | * | 7/2010 | Ishiguro et al. | 280/739 |
| 7,784,819 | B2 | * | 8/2010 | Lawall et al. | 280/728.3 |
| 7,784,828 | B2 | * | 8/2010 | Matsu et al. | 280/739 |
| 2001/0024033 | A1 | * | 9/2001 | Webber et al. | 280/741 |
| 2001/0035637 | A1 | * | 11/2001 | Thomas et al. | 280/736 |
| 2006/0151975 | A1 | * | 7/2006 | Yamaji et al. | 280/728.2 |

(Continued)

FOREIGN PATENT DOCUMENTS

JP 2002193058 A 7/2002

(Continued)

*Primary Examiner*—Paul N Dickson
*Assistant Examiner*—Nicole Verley
(74) *Attorney, Agent, or Firm*—Gifford, Krass, Sprinkle, Anderson & Citkowski, P.C.

(57) ABSTRACT

An airbag device includes: a bag body; a linkage member whose an end portion is provided with a latch stopper hole; and a retention device that has a retention member capable of penetrating the latch stopper hole, and that retains the linkage member while the latch stopper hole is penetrated by the retention member, and that discontinues retention of the linkage member as the retention member comes out of the latch stopper hole. The retention member is provided with a slope surface that transforms into a force acts in a direction from a site relatively near to a base end of the retention member to the distal end of the retention member.

13 Claims, 10 Drawing Sheets

U.S. PATENT DOCUMENTS

| | | | |
|---|---|---|---|
| 2006/0192370 A1* | 8/2006 | Abe et al. | 280/735 |
| 2007/0075537 A1* | 4/2007 | Rust | 280/739 |
| 2007/0170709 A1* | 7/2007 | Braun et al. | 280/739 |
| 2007/0194561 A1* | 8/2007 | Thomas | 280/728.2 |
| 2008/0100049 A1* | 5/2008 | Webber | 280/743.2 |
| 2009/0218795 A1* | 9/2009 | Fukawatase et al. | 280/736 |

FOREIGN PATENT DOCUMENTS

| | | |
|---|---|---|
| JP | 2004521801 T | 7/2004 |
| JP | 2006176091 A | 7/2006 |
| JP | 2008279822 A | 11/2008 |

* cited by examiner

AIRBAG DEVICE

INCORPORATION BY REFERENCE

The disclosure of Japanese Patent Application No. 2008-034881 filed on Feb. 15, 2008 including the specification, drawings and abstract is incorporated herein by reference in its entirety.

BACKGROUND OF THE INVENTION

1. Field of the Invention

The invention relates to an airbag device that is mounted in a vehicle and that deploys a bag body, for example, in front of an occupant, or the like, during a sudden deceleration state of the vehicle, or the like.

2. Description of the Related Art

In an airbag device disclosed in U.S. Pat. No. 6,513,835B2, one-side ends of a pair of straps (linkage member) are connected to a bag body. The other-side end of each strap has a loop that is penetrated by a rod. While the latch loops of the straps are penetrated by the rod (retention member), the inflation and deployment of the bag body is restricted by the straps. However, when the rods move out of the latch loops and therefore the straps are released, the restriction on the inflation and deployment of the bag body imposed by the straps is removed. This makes it possible to control the deployed shape of the bag body.

However, the rod have the shape of a simple bar substantially orthogonal to the direction in which the loops come apart from the rod. Therefore, when a rod moves in such a direction as to move out of the latch loops, the latch loops may sometimes get caught on the rod, so that the strap cannot be smoothly released.

SUMMARY OF THE INVENTION

It is an object of the invention to provide an airbag device capable of smoothly performing the coming apart of a retention member from a latch loop formed in an end portion of a linkage member, and also capable of smoothly discontinuing the retention of the end portion of the linkage member.

An airbag device in accordance with an aspect of the invention includes: a bag body that inflates and deploys as gas is supplied into the bag body and therefore an internal pressure of the bag body rises; a linkage member whose first end portion is bound to the bag body and whose second end portion is provided with a latch stopper hole; and a retention device that has a retention member capable of penetrating the latch stopper hole, and that retains the second end portion of the linkage member while the latch stopper hole is penetrated by the retention member, and that discontinues retention of the second end portion of the linkage member as the retention member comes out of the latch stopper hole, and that is able to make at least one of a deployed shape of the bag body and the internal pressure of the bag body different, by discontinuing the retention, from a state of the at least one of the deployed shape and the internal pressure brought about while the second end portion of the linkage member is retained. Furthermore, in this airbag device, the retention member is provided with a slope surface that transforms a portion of a force that is applied to the retention member from an inner edge of the latch stopper hole provided on the linkage member and pulls the second end portion of the linkage member toward the first end portion of the linkage member into a force that acts in a direction from a site relatively near to a base end of the retention member to the distal end of the retention member.

In the airbag device in accordance with the foregoing aspect of the invention, as the inside of the bag body is supplied with gas and therefore the internal pressure of the bag main body rises, the bag main body inflates and deploys. Besides, the first end portion of the linkage member is bound to the bag body, and the latch stopper hole formed on the second end portion of the linkage member is penetrated by the retention member of the retention device. Thus, during the state in which the latch stopper hole is penetrated by the retention member, the second end portion of the linkage member is retained by the retention member when the bag body is inflated and deployed.

On the other hand, if the retention member moves to come out of the latch stopper hole and therefore the retention of the linkage member by the retention member discontinues, the state in which the bag body has been inflated and deployed has been made different in at least one of the deployed shape and the internal pressure from what is obtained when the retention of the linkage member is maintained.

The retention member is provided with a slope surface that transforms a portion of a force that is applied to the retention member from an inner edge of the latch stopper hole provided on the linkage member and pulls the second end portion of the linkage member toward the first end portion of the linkage member into a force that acts in a direction from a site relatively near to a base end of the retention member to the distal end of the retention member. Therefore, when the linkage member is pulled to the first end portion, the latch ring moves, sliding on the slope surface, relative to the retention member due to the tension that acts in the linkage member. Therefore, the retention member can smoothly come out of the latch ring, so that the retention of the linkage member can be smoothly discontinued.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

Construction of First Embodiment

Figure 1:
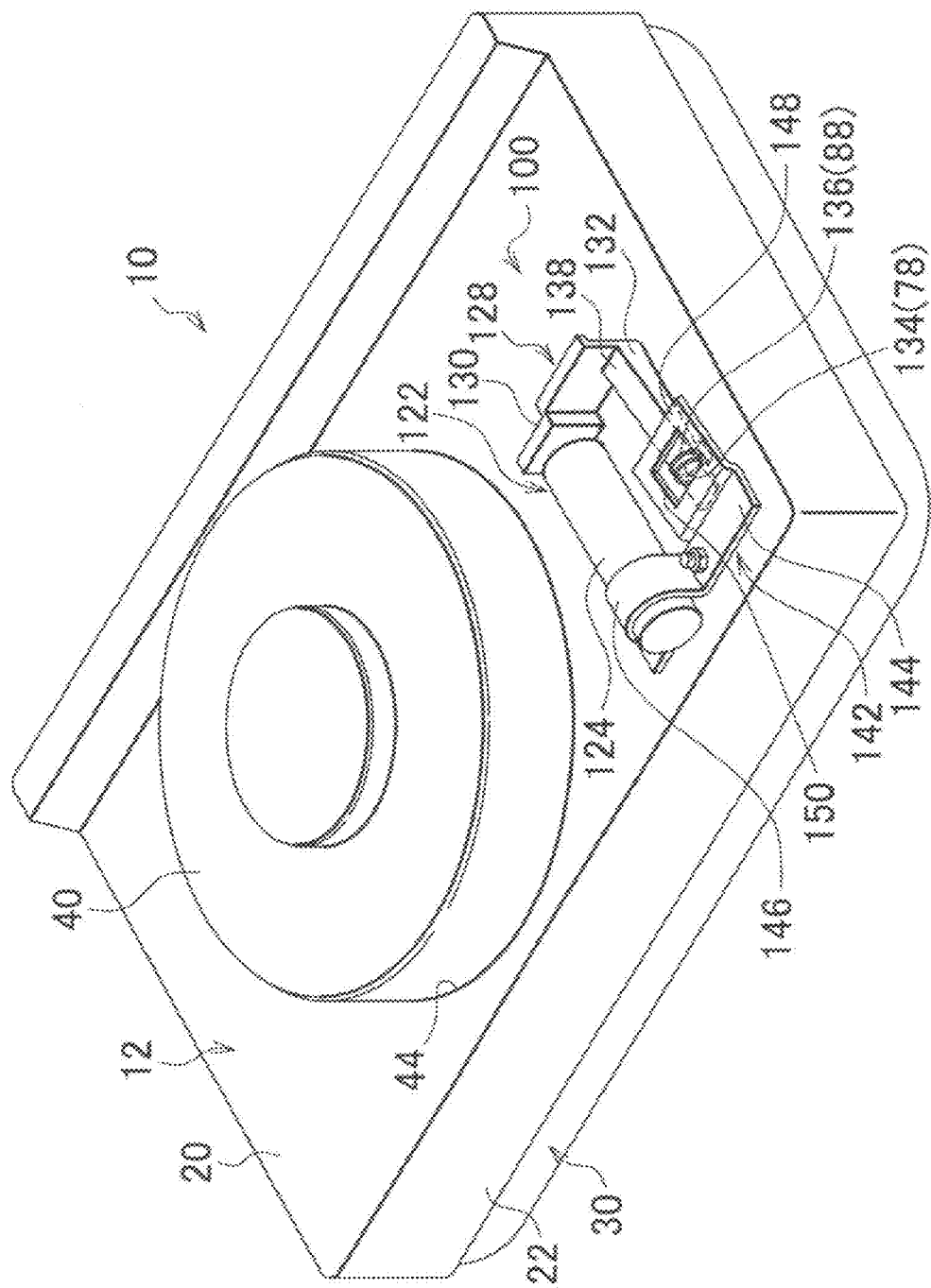
FIG. 1 is a perspective view of an airbag device in accordance with a first embodiment of the invention, viewed from the reverse side.

FIG. 1 shows portions of an airbag device 10 in accordance with a first embodiment of the invention, in a perspective view taken from a reverse surface side.

Figure 5:
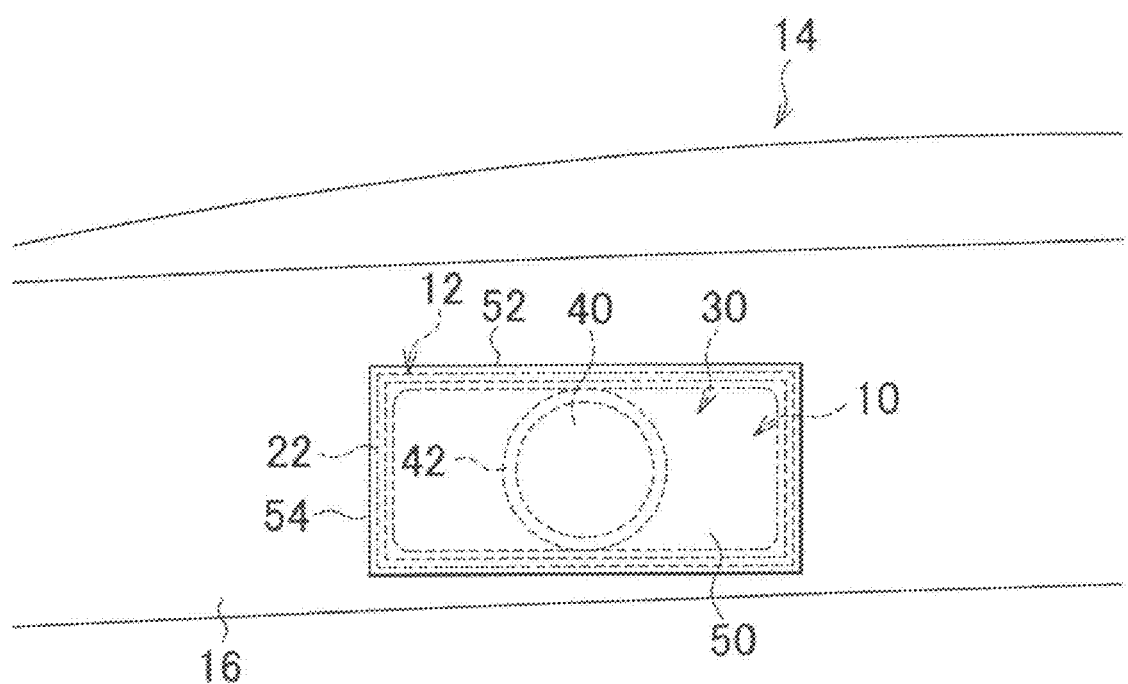
FIG. 5 is a plan view of an installation site of an airbag device in accordance with a first embodiment of the invention in a vehicle cabin in a state where the airbag device is not activated.
Figure 6:
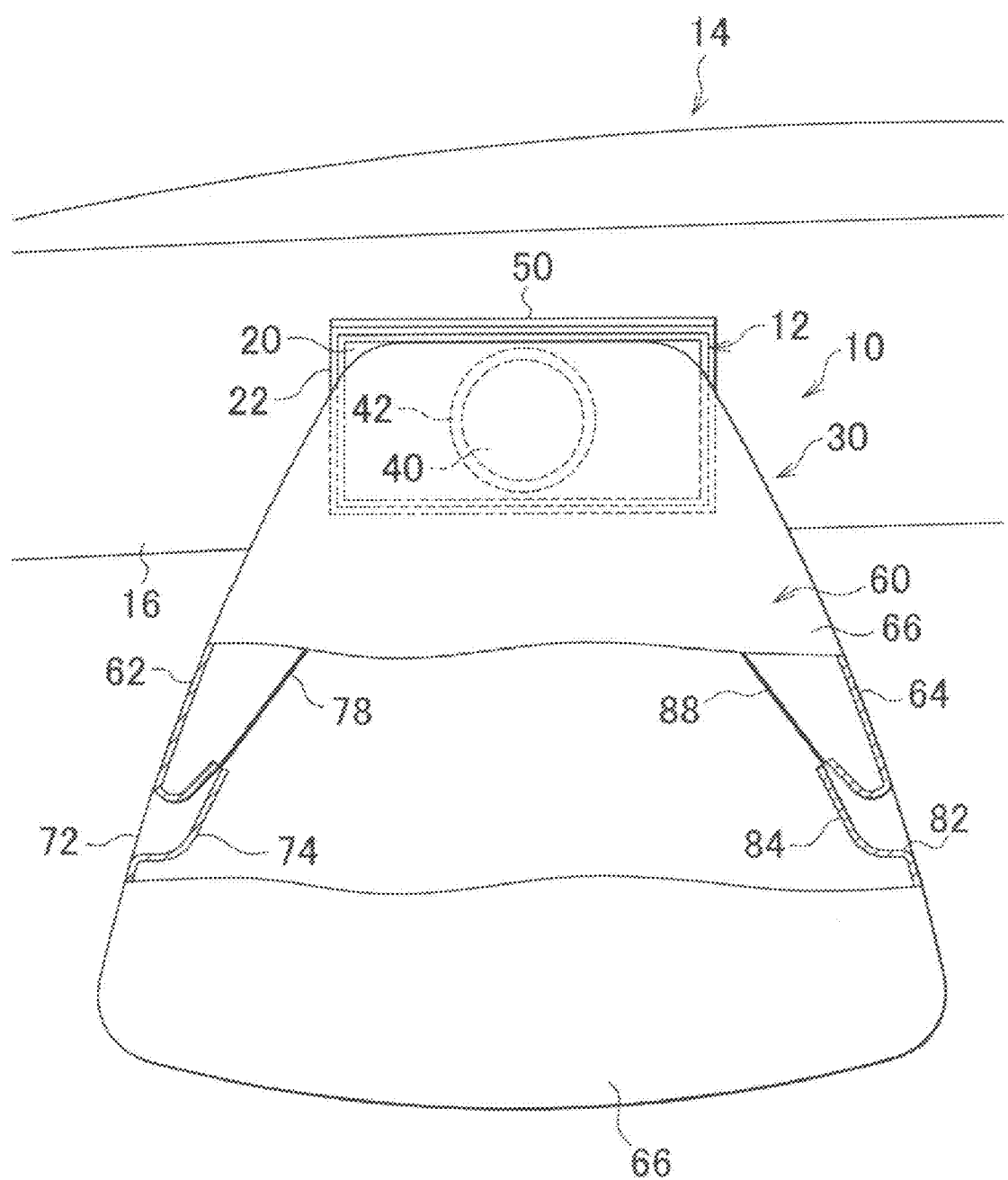
FIG. 6 is a plan view corresponding to FIG. 5 and showing a state in which a bag body has inflated and deployed, with a distal end side of each tube vent retained.
Figure 7:
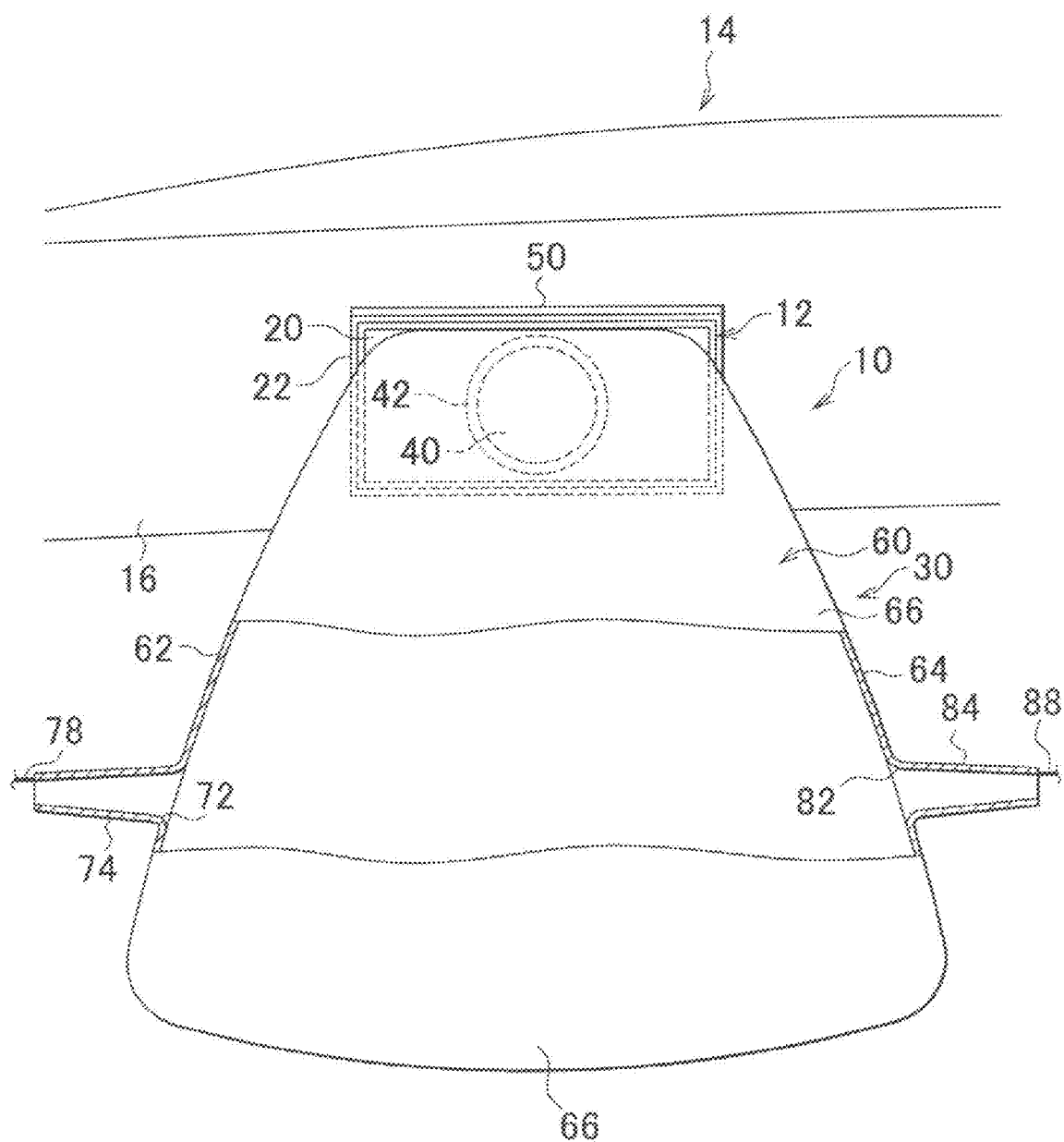
FIG. 7 is a plan view corresponding to FIG. 5 and showing a state in which the retention of the distal end side of each tube vent has been discontinued, so that the tube vents are stretched out into the outside of the bag body.

As shown in this drawing, the airbag device 10 includes a base plate 12 as a support body. If the airbag device 10 is a device for the passenger seat of a vehicle 14 as shown in FIGS. 5 to 7, the airbag device 10 is fixed to a vehicle body structure member, such as a reinforcement or the like, at a reverse surface side of an instrument panel 16 of a vehicle 14. Besides, if the airbag device 10 is a device for the driver's seat of the vehicle 14, although not illustrated particularly in detail, the base plate 12 is disposed at an inner side of a rim that constitutes the steering wheel, and is fixed to spokes of the steering wheel, or the like.

The base plate 12 has a bottom wall 20 of a generally rectangular shape in a plan view which forms a flat surface that includes most of the reverse surface side of the base plate 12. The bottom wall 20 corresponds to a general surface. A peripheral wall 22 stands upward (downward in FIG. 1) from an outer peripheral portion of the bottom wall 20. Besides, the base plate 12 is provided with a bag body 30 in a folded state. An opening end of the bag body 30 is fixed to the bottom wall 20 on an inner side of the peripheral wall 22 by a bracket or the like. Besides, the base plate 12 is provided with an inflator 40. A main body portion of the inflator 40 has a generally disc shape, or a generally cylindrical shape with a relatively short dimension in the direction of the axis.

A flange portion 42 shown in FIGS. 5 to 7 (not shown in FIG. 1) is formed on an intermediate portion of the main body portion of the inflator 40 in the direction of the axis. Furthermore, a lower-side portion (shown as an upper-side portion in FIG. 1) of the main body portion of the inflator 40 that is on the lower side of the flange portion 42 penetrates a circular hole 44 that is formed in the bottom wall 20. The inflator 40, partially penetrates the circular hole 44 in this manner, is fixed to the bottom wall 20, with the flange portion 42 of the inflator 40 being in contact with an upper surface of the bottom wall 20, and with a space between the circular hole 44 and the inflator 40 being sealed.

The inflator 40, mounted on the base plate 12 in this manner, is positioned at the inner side of the opening end of the bag body 30 disposed in the folded state. When activated, the inflator 40 instantaneously generates a gas, and releases the generated gas to the outside of the inflator 40 at an upper side above the bottom wall 20. The gas released from the inflator 40 in this manner inflates the bag body 30 by its pressure.

As shown in FIG. 5, an airbag door 50 is formed in the instrument panel 16 of the vehicle 14, corresponding to the airbag device 10. An outer peripheral shape of the airbag door 50 is a rectangle in a plan view that is larger than the outer peripheral shape of the peripheral wall 22 (i.e., the base plate 12). A hinge portion 52 is formed at the boundary between a front side portion of the airbag door 50 and a portion of the instrument panel 16 that excludes the airbag door 50. A portion of the instrument panel 16 defined as the hinge portion 52 is thinner in wall thickness than the portion of the instrument panel 16 that excludes the hinge portion 52, so that the hinge portion 52 is weaker in mechanical strength than the portion of the instrument panel 16 that excludes the hinge portion 52.

A rupturable portion 54 is formed at a boundary between right and left sides and a rear side of the airbag door 50 and the portion of the instrument panel 16 that excludes the airbag door 50. A portion of the instrument panel 16 defined as the rupturable portion 54 is even thinner in wall thickness than the portion of the instrument panel 16 defined as the hinge portion 52. Therefore, the rupturable portion 54 is even weaker in mechanical strength than the hinge portion 52.

When the bag body 30 inflating due to the pressure of the gas supplied from the inflator 40 presses the airbag door 50 from the reverse surface side of the instrument panel 16, rupture occurs in the instrument panel 16 at the rupturable portion 54, and then the airbag door 50 pivots about the hinge portion 52 upward and forward. As a result, the instrument panel 16 is opened at a position where the airbag door 50 is disposed, so that the inflating bag body 30 can deploy to a cabin inner side in the vehicle 14.

On the other hand, the bag body 30 has a bag main body 60, as shown in FIGS. 6 and 7. The bag main body 60 has a side base cloth 62 whose external surface faces one of the sides in the width direction of the vehicle 14 during an inflated-and-deployed state of the bag body 30, and a side base cloth 64 that faces the other side in the width direction of the vehicle 14 during the inflated-and-deployed state. An outer peripheral portion of the side base cloth 62 and an outer peripheral portion of the other side base cloth 64 are interconnected by an outer peripheral base cloth 66, except for portions of the side base cloths that form the opening end of the bag body 30. Thus, the bag main body 60 is formed in a bag shape as a whole.

Besides, as shown in FIGS. 6 and 7, a hole portion 72 is formed in the side base cloth 62. Corresponding to the hole portion 72, a cylindrical tube vent 74 is provided in the side base cloth 62. In this embodiment, the tube vent 74 is open at both ends, and is formed so as to taper from a base end side to a distal end side of the tube vent 74 in a deployed state. A base end portion of the tube vent 74 (a base end-side opening end of the tube vent 74) connects to a peripheral edge of the hole portion 72. Thus, the tube vent 74 and an interior of the bag main body 60 communicate with each other, via the hole portion 72.

A first end portion of a tether 78 as a linkage member is latched to a distal end of the tube vent 74. The tether 78 has flexibility and is formed in an elongated string shape or an elongated thin-width band. A second end-side portion of the tether 78 extends inside the bag main body 60, passes through a small hole 80 formed in the bottom wall 20 (see FIGS. 1 and 2), and extends to the outside of the base plate 12.

Besides, as shown in FIGS. 6 and 7, a hole portion 82 is formed in the other side base cloth 64. Corresponding to the hole portion 82, a cylindrical tube vent 84 is provided in the side base cloth 64. In this embodiment, the tube vent 84, similar to the tube vent 74, is open at both ends, and is formed so as to taper from a base end side to a distal end side of the tube vent 84 in the deployed state. A base end portion of the tube vent 84 (a base end-side opening end of the tube vent 84) connects to a peripheral edge of the hole portion 82. Thus, the tube vent 84 and the interior of the bag main body 60 communicate with each other, via the hole portion 82.

A first end portion of a tether 88 as a linkage member is latched to a distal end of the tube vent 84. The tether 88 has flexibility and is formed in an elongated string shape or an elongated thin-width band. A second end-side portion of the tether 88 extends inside the bag main body 60, and passes through a small hole 80 formed in the bottom wall 20 (see FIG. 2), and extends to the outside of the base plate 12.

Figure 2:
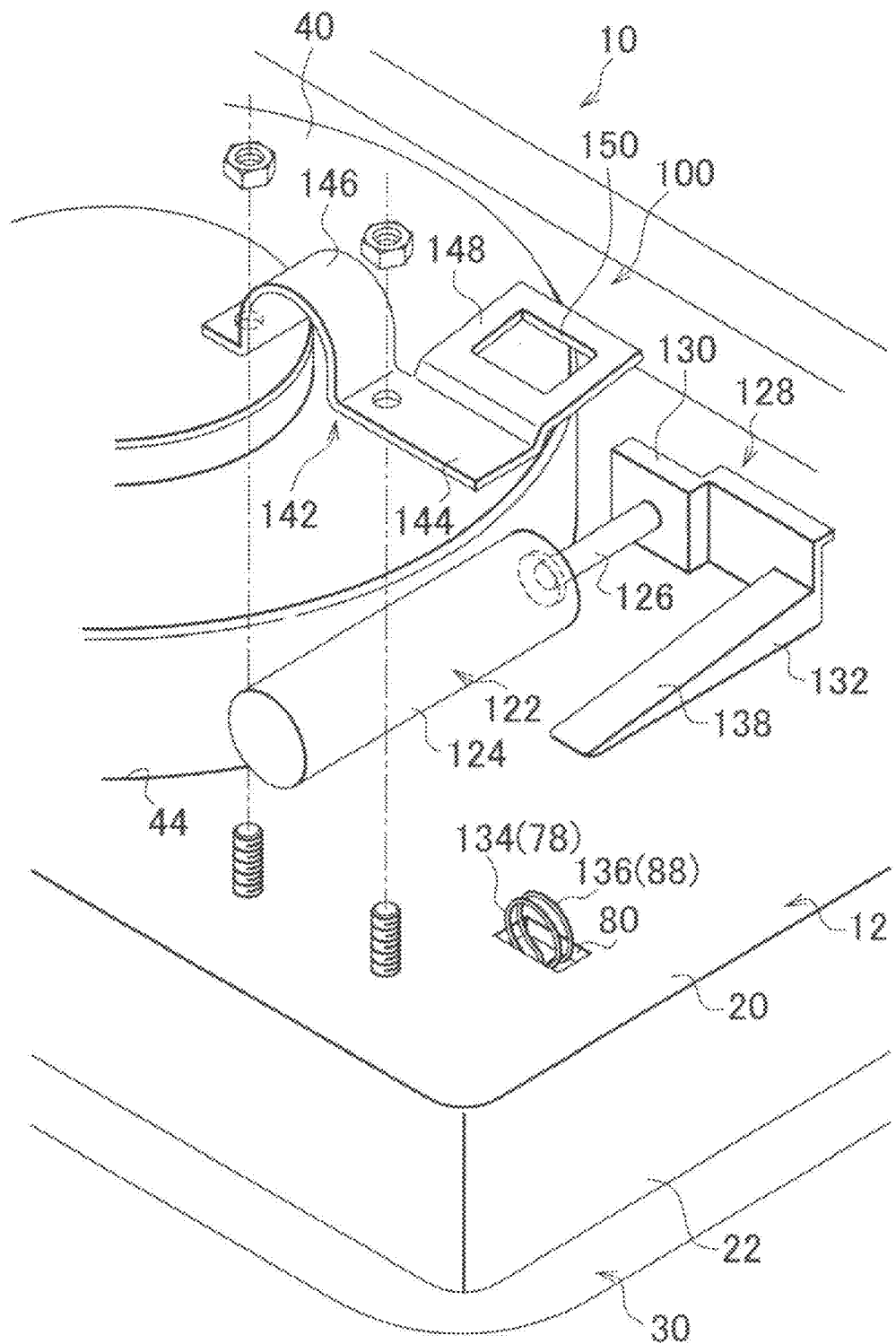
FIG. 2 is an enlarged exploded perspective view of portions of the airbag device in accordance with the first embodiment of the invention.

A tether retention device 100 as a retention device is provided on the reverse surface side of the bottom wall 20 (as a general portion) that constitutes the base plate 12. That is, a tether retention device 100 is provided on a face opposite to an occupant-side face of the bottom wall 20. As shown in FIG. 2, the tether retention device 100 has a micro gas generator 122. The micro gas generator 122 has a cylinder 124 whose axis lies in a direction parallel with an external surface of the bottom wall 20. Inside the cylinder 124, a piston (not shown) is slidably housed along the direction of the axis of the cylinder 124. A base end portion of a rod 126 is integrally bound to an end of the piston extending along the axis direction of the cylinder 124. A distal end-side portion of the rod 126 extends to the outside of the cylinder 124, and a distal end there of is linked with the slider 128. The slider 128 has a linkage piece 130.

The linkage piece 130 is formed in a platy shape whose thickness direction is along the axis direction of the cylinder 124. The lengthwise direction of the linkage piece 130 is substantially parallel to the external surface of the bottom wall 20, and a distal end of the rod 126 is integrally bound to a surface of one of two opposite end portions of the linkage piece 130 in its lengthwise direction. A retention piece 132 is formed at a position on the other end portion of the linkage piece 130 in its lengthwise direction which is relatively close to the bottom wall 20. The retention piece 132 is formed in the shape of a plate the length and the width of which are substantially parallel to the external surface of the bottom wall 20. A base end portion of the retention piece 132 in its lengthwise direction connects to the linkage piece 130. The direction along the length of the retention piece 132 to its distal end and the direction along the length of the rod 126 to its distal end are opposite to each other. Incidentally, a surface of the retention piece 132 that faces the bottom wall 20 extends parallel to the length of the rod 126.

The retention piece 132 extends over the small hole 80 formed in the bottom wall 20, and penetrates an annular latch ring 134 as a latch stopper hole that is formed at the second end portion of the tether 78, and also penetrates an annular latch ring 136 as a latch stopper hole that is formed at the second end portion of the tether 88. Thus, due to the penetration of the distal end portion of the retention piece 132 through the latch rings 134, 136, the second end portions of the tethers 78, 88 are restricted from passing through the small hole 80 to the inner side of the base plate 12.

Figure 3:
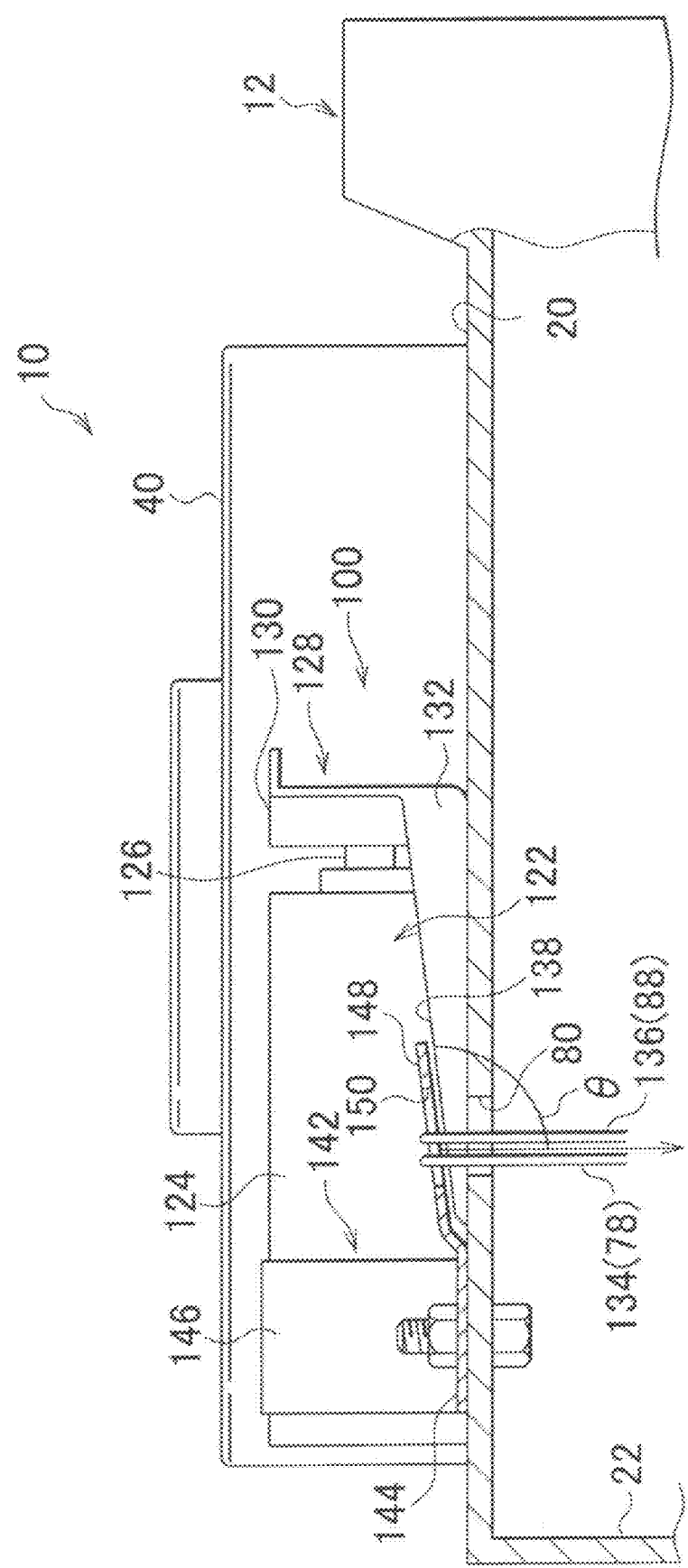
FIG. 3 is a front sectional view showing a state in which latch rings are penetrated by a retention member.
Figure 4:
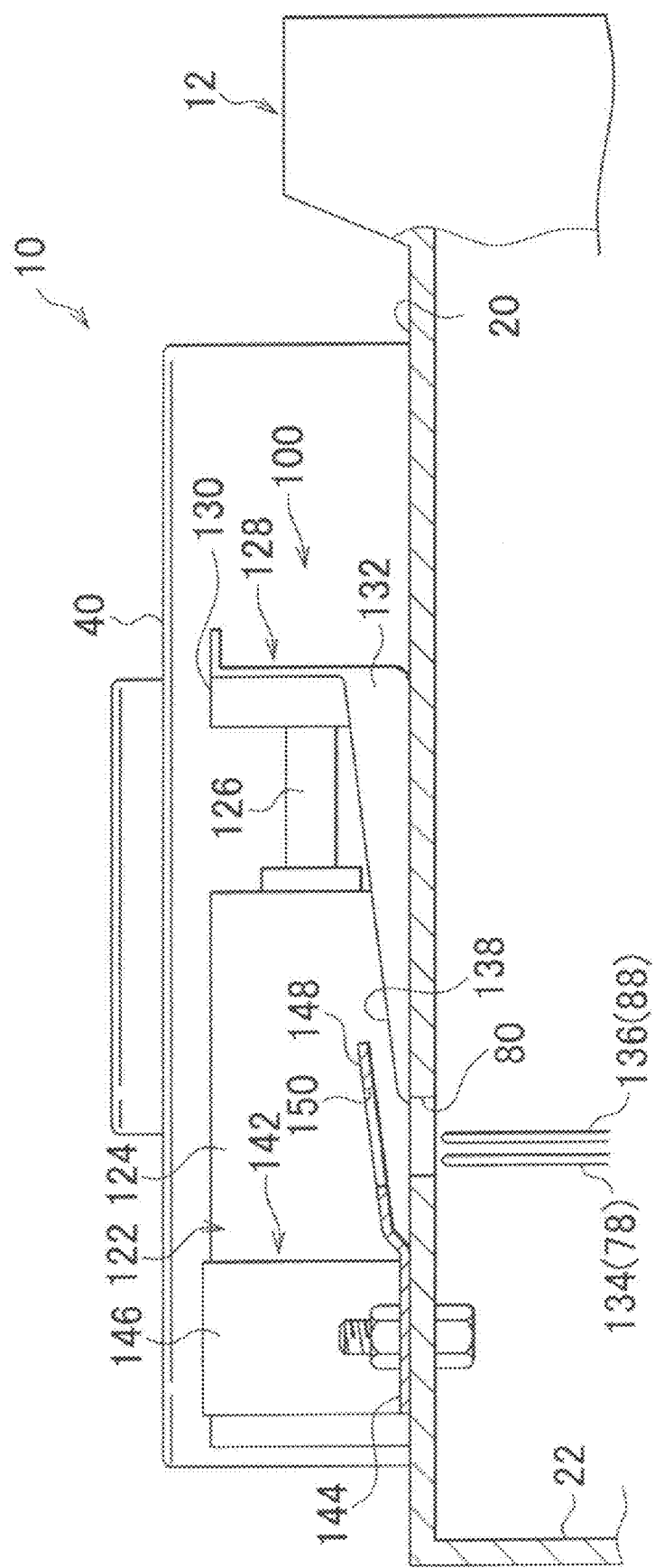
FIG. 4 is a front sectional view showing a state in which the retention member has slid out of the latch rings.

Besides, a surface of the retention piece 132 opposite to the surface thereof that faces the bottom wall 20 (as a surface opposite to an occupant-side face of the retention member) is a slope surface 138. The slope surface 138 is sloped so as to come progressively closer to the bottom wall 20, from the base end portion to the distal end of the slope surface 138 in the lengthwise direction. Therefore, as shown in FIGS. 3 and 4, the retention piece 132 is tapered so that the thickness thereof becomes progressively smaller from the base end portion to the distal end thereof in the lengthwise direction (i.e., the height of the retention piece 132 becomes progressively lower from the base end portion to the distal end of the retention piece 132 in its lengthwise direction so that the retention piece 132 becomes closer in that manner to the bottom wall 20 that corresponds to a general surface and that forms a flat surface that includes most of the reverse surface of the base plate 12). In other words, the retention piece 132 is sloped so that the distal end thereof in the lengthwise direction is nearer than the base end portion thereof to the first end of the tether 78.

The inside of the cylinder 124 (more specifically, a space within the cylinder 124 that is opposite from the rod 126 of the piston) contains a gas-generating agent that instantaneously generates a gas when burning, and an ignition device that ignites the gas-generating agent on the basis of an ignition signal from a control portion (not shown), such as an airbag ECU or the like. When the gas-generating agent burns to generate a gas within the cylinder 124 and therefore the internal pressure of the cylinder 124 rises, the piston in the cylinder 124 slides. When the piston slidingly moves in this manner, the rod 126 slides, and the slider 128 moves away from the cylinder 124. As the retention piece 132 moves out of the latch rings 134, 136 along with the movement of the slider 128, the retention of the tethers 78, 88 by the retention piece 132 discontinues, so that the second end portions of the tethers 78, 88 can pass through the small hole 80 and move to the inner side of the base plate 12.

The tether retention device 100 also has a stationary member 142. The stationary member 142 has a platy base portion 144. A generator retention piece 146 extends from the base portion 144. The generator retention piece 146 is curved so as to be gradually apart from the bottom wall 20 and extend along the outer peripheral shape of the cylinder 124. At the inner side of the curve of the generator retention piece 146, the cylinder 124 is disposed. As the stationary member 142 is screwed to the bottom wall 20, the cylinder 124 is sandwiched between the generator retention piece 146 and the bottom wall 20.

Besides, a slide guide 148 extends out from a portion of the base portion 144 of the stationary member 142 that faces the distal end portion of the retention piece 132 in the lengthwise direction of the retention piece 132. The slide guide 148 is formed so that a distal end side thereof is apart from the external surface of the bottom wall 20 by a distance that is larger than the thickness of the retention piece 132. The retention piece 132 extends into the space between the slide guide 148 and the bottom wall 20. A rectangular hole portion 150 corresponding to the small hole 80 is formed in the slide guide 148. Portions of the latch rings 134, 136 extending around the retention piece 132 which are positioned at the slide guide 148 side of the retention piece 132 are located in the opening of the hole portion 150.

Operation and Effects of First Embodiment

Operation and effects of this embodiment will next be described.

In this airbag device 10, when a vehicle state detection sensor, such as an acceleration sensor or the like, detects that the vehicle has entered a sharp deceleration state and a detection signal output from the detection sensor is input to a control portion such as an airbag ECU or the like, the ignition device (not shown) provided for the inflator 40 is activated. When the ignition device of the inflator 40 activates, the gas-generating agent in the inflator 40 is caused to burn by the ignition device. When the gas-generating agent burns, a large amount of gas is generated instantaneously.

The gas thus generated in the inflator 40 is released out of the inflator 40 at an upper side above the bottom wall 20. Since the inflator 40 is provided inside the opening end of the bag body 30, the gas released from the inflator 40 is fed into the bag body 30. As the gas is fed into the bag body 30, the bag body 30 inflates. The inflated bag body 30 presses the airbag door 50 from the reverse side of the instrument panel 16. As the airbag door 50 is pressed by the bag body 30, the rupturable portion 54 of the instrument panel 16 ruptures, so that the airbag door 50 is pivoted about the hinge portion 52 serving as an axis. When a rectangular hole is thus formed in the instrument panel 16 as shown in FIG. 6, the inflated bag body 30 is deployed from the rectangular hole into a space in front of the seat that corresponds to the airbag device 10, in the cabin of the vehicle.

Thus, as the occupant in a seat that corresponds to the airbag device 10 moves toward a front of the vehicle 14 by inertia at the time of sharp deceleration of the vehicle while the bag body 30 is in a deployed state in the cabin, the deployed bag body 30 receives the occupant's body.

During the process of inflation and deployment of the bag body 30, the hole portions 72, 82 move away from the base plate 12. As the hole portions 72, 82 move away from the base plate 12 in this manner, the tethers 78, 88 whose second end portions are retained by the retention piece 132 of the tether retention device 100 and whose first end portions are positioned near the hole portions 72, 82 are stretched. As the bag body 30 is further inflated and deployed so that the hole portions 72, 82 move away from the base plate 12 while the tethers 78, 88 are in a stretched state, the tethers 78, 88 pull the distal ends of the tube vents 74, 84. Therefore, when the bag body 30 is inflated to a deployed state in the cabin of the vehicle 14, the tube vents 74, 84 are pulled by the tethers 78, 88 so that their distal end-side portions extend from their base end-side portions into an inner space in the bag main body 60.

Herein, if it is determined that the body size of the occupant sitting in the seat is not small on the basis of a signal from an occupant's body size detection sensor, for example, a load sensor provided in the seat, or the like, the micro gas generator 122 is not activated, so that the retention piece 132 remains extending through the latch rings 134, 136 of the tethers 78, 88. Therefore, the tube vents 74, 84 are pulled and retained by the tethers 78, 88 so that the distal end-side portions thereof are stretched from the base end-side portions thereof into the internal space of the bag main body 60.

During this state, the tube vents 74, 84 are flattened or pressed by the pressure in the bag main body 60, thus restraining gas leakage from the inside of the bag body 30 to the outside of the bag body 30 via the tube vents 74, 84. Therefore, the internal pressure of the bag body 30 can be maintained during the inflated and deployed state of the bag body 30, so that the inflated and deployed bag body 30 can effectively receive a relatively large-size occupant's body.

On the other hand, if it is determined that the body size of the occupant sitting in the seat is small on the basis of a signal from the occupant's body size detection sensor, for example, a load sensor provided in the seat, or the like, an ignition signal is output to the ignition device of the micro gas generator 122 as well when an ignition signal is output to the ignition device of the inflator 40 from the control portion, such as an airbag ECU or the like. As the ignition device of the micro gas generator 122 activates, the gas-generating agent in the cylinder 124 burns to generate gas in the cylinder 124. As a result, the internal pressure of the cylinder 124 rises so that the piston in the cylinder 124 slides.

Due to the sliding movement of the piston, the rod 126 slides, and the slider 128 moves away from the cylinder 124. Thus, the retention piece 132 slides as shown in FIG. 4. It is to be noted herein that the direction of the slope surface 138 of the retention piece 132 slopes in a direction opposite to the moving direction in which the latch rings 134, 136 move toward the small hole 80 when the latch rings 134, 136 pass through the small hole 80, so that the thickness of the retention piece 132 becomes progressively smaller from the base end side toward the distal end side thereof. Besides, when the slope surface 138 contacts with an inner edge of the latch rings 134, 136 and when a tensile force of the tethers 78, 88 is applied to the retention piece 132 from the inner edge of the latch rings 134, 136, the angles θ formed by line segments connecting the contact points and the first ends of the tethers 78, 88, and line segments connecting the contact points and a base end of the slope surface 138 are obtuse angle. Therefore, when the retention piece 132 slides, the tension that corresponds to the force that pulls the second end portions of the tethers 78, 88 to toward the first end portions thereof is transmitted from inner edges of the latch rings 134, 136 to the slope surface 138, and a portion of the tension is transformed into a component force that is in a direction along the slope surface 138 and that acts from a base end side to a distal end side of the retention piece 132. Therefore, the latch rings 134, 136 moves relative to the retention piece 132 so as to slide on the slope surface 138 toward the distal end side of the retention piece 132. Thus, the retention piece 132 smoothly moves out of the latch rings 134, 136. If the length direction of the retention piece 132 and the length direction of the rod 126 are not parallel to each other (i.e., if the retention piece 132 and the rod 126 are skew to each other), there is a possibility that the retention piece 132 may get caught on the bottom wall 20 or the slide guide 148 when the rod 126 slides. However, since the retention piece 132 extends parallel to the length direction of the rod 126, the retention piece 132 smoothly moves without getting caught on the bottom wall 20 or the slide guide 148 when the rod 126 is driven.

As the retention piece 132 moves out of the latch rings 134, 136 in this manner, the retention of the tethers 78, 88 by the retention piece 132 discontinues. Then, as the bag body 30 inflates and deploys from this state, the internal pressure of the bag body 30 forces the tube vents 74, 84 out of the hole portions 72, 82. Thus, the tube vents 74, 84 turn inside out, starting with the base end-side portions thereof moving to the outside of the bag main body 60 from the hole portions 72, 82.

When the tube vents 74, 84 entirely stretch out into an outer space around the bag main body 60 through the progressive inside-out turning of the tube vents 74, 84 that starts from the base end side as shown in FIG. 7, gas in the bag body 30 flows from the hole portions 72, 82 into the tube vents 74, 84, and the pressure of the gas inflates the tube vents 74, 84, so that the distal end portions of the tube vents 74, 84 become open. As a result, the inside and the outside of the bag main body 60 are interlinked via the tube vents 74, 84, and gas in the bag body 30 is released to the outside of the bag body 30. Since the release of gas from inside the bag body 30, the internal pressure of the bag body 30 reduces. Thus, the bag body 30 has a reduced tension when the bag body 30 receives an occupant of a relatively small body size.

Thus, in the airbag device 10, when the retention of the tube vents 74, 84 by the retention piece 132 via the tethers 78, 88 is discontinued as described above, the retention piece 132 can smoothly move out of the latch rings 134, 136. Thus, the retention of the tube vents 74, 84 can be smoothly discontinued to release air from inside the bag body 30 to the outside.

Incidentally, although in the embodiment, the tethers 78, 88 are connected to the tube vents 74, 84, it is also permissible to adopt, for example, a construction in which the first end portions of the tethers 78, 88 are bound to the side base cloths 62, 64 or the outer peripheral base cloth 66 so as to make the deployed shape of the bag main body 60 different between before and after the retention of the second end portions of the tethers 78, 88 is discontinued.

Construction of Second Embodiment

A second embodiment of the invention will next be described. Incidentally, in the description of this embodiment, basically the same sites and the like as those in the first embodiment are presented with the same reference characters, and detailed descriptions thereof will be omitted.

Figure 8:
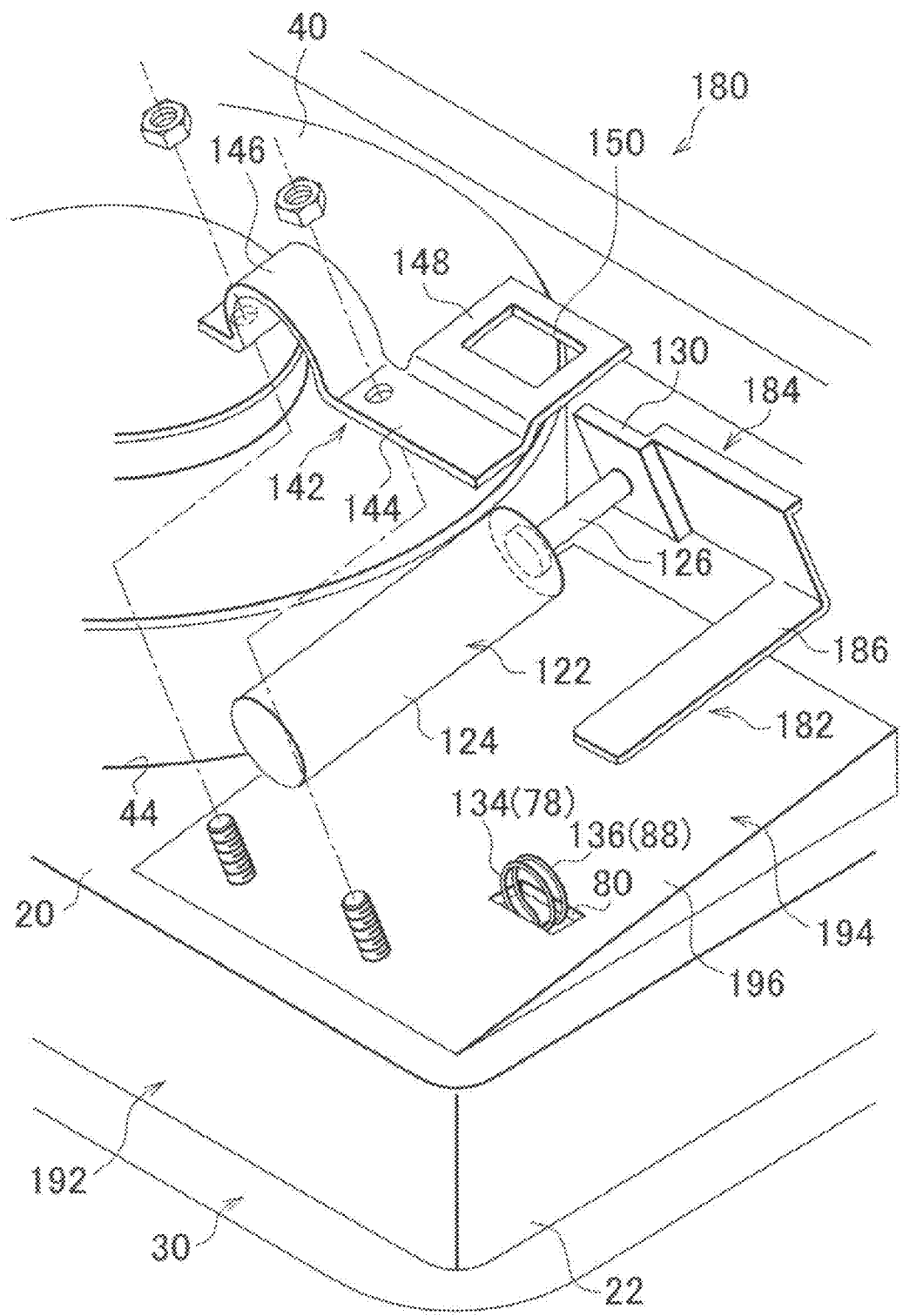
FIG. 8 is an enlarged exploded perspective view of portions of an airbag device in accordance with a second embodiment of the invention.

FIG. 8 shows portions of a construction of an airbag device 180 in accordance with this embodiment, in an enlarged perspective view taken from the reverse side. As shown in FIG. 8, the airbag device 180 has the tether retention device 182 as a retention device. The tether retention device 182 does not have a slider 128, but has a slider 184 instead. The slider 184 does not have the retention piece 132, but instead has a retention piece 186 as a retention member. Unlike the retention piece 132, the retention piece 186 in this embodiment is formed in a flat platy shape in which the thickness thereof is substantially uniform from the base end side to the distal end side, and two opposite surfaces thereof are substantially parallel in the sliding direction of the rod 126.

Besides, the airbag device 180 does not have the base plate 12, but instead has a base plate 192 as a support body. A slope platform 194 as a slope portion is formed on a bottom wall 20 which forms flat surface that includes most of the reverse surface side of the base plate 192 and which corresponds to a general surface. The slope platform 194 is formed to have a recessed shape that is open to an inner side of the base plate 192 (a vehicle cabin side) by partially deforming the bottom wall 20. The slope platform 194 has a sloped wall 196. An external surface of the sloped wall 196 is a flat surface. Furthermore, the external surface of the sloped wall 196 is sloped so as to come progressively closer to the external surface of the bottom wall 20, with displacement from the base end side to the distal end side of the retention piece 186. Besides, this sloped wall 196 has a small hole 80.

The foregoing tether retention device 182 is mounted onto the sloped wall 196 on the slope platform 194.

Operation and Effects of Second Embodiment

Figure 9:
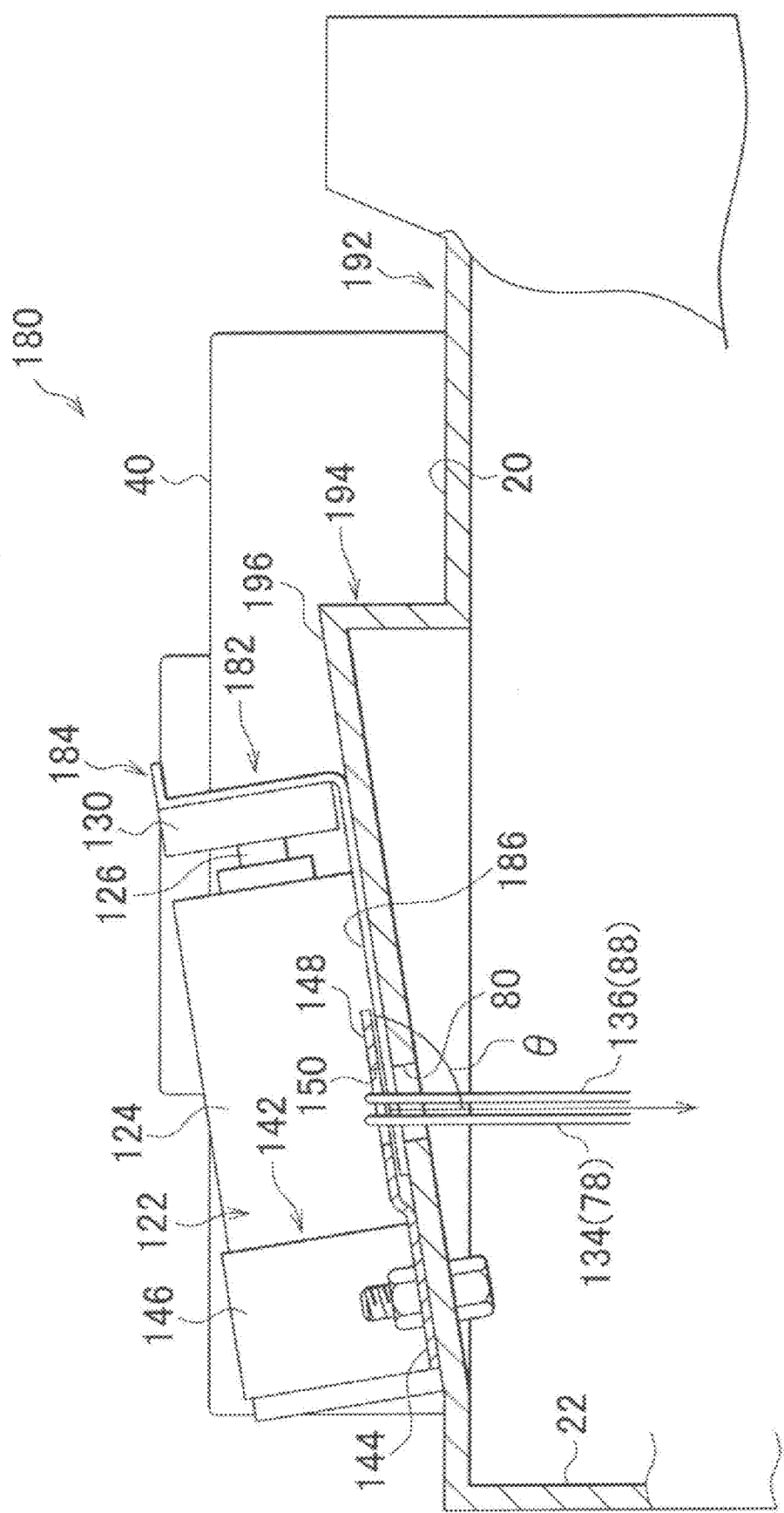
FIG. 9 is a font sectional view corresponding to FIG. 8 and showing a state in which latch rings are penetrated by a retention member.
Figure 10:
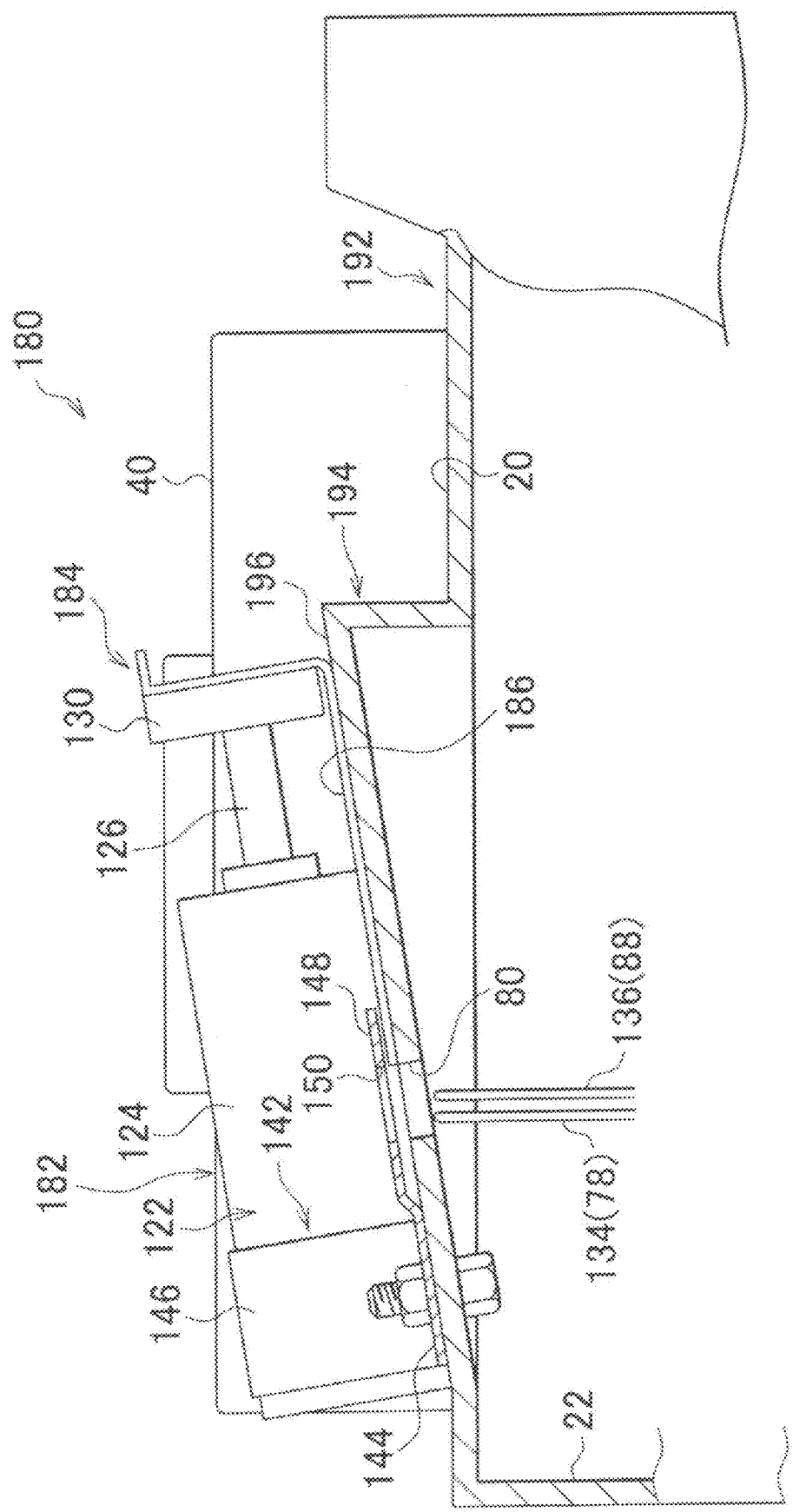
FIG. 10 is a front sectional view corresponding to FIG. 8 and showing a state in which the retention member has slid out of the latch rings.

When the tether retention device 182 activates with the retention piece 186 penetrating the latch rings 134, 136 as shown in FIG. 9, the rod 126 slides, and therefore slides the retention piece 186 so that the retention piece 186 moves out of the latch rings 134, 136 as shown in FIG. 10. It is to be noted herein that the retention piece 186 has a flat plate shape in which a surface facing the sloped wall 196 and the opposite side surface are parallel to each other in the sliding direction of the rod 126, and none of the surfaces of the retention piece 186 is sloped. However, the sloped wall 196 of the slope platform 194 on which the tether retention device 182, including the retention piece 186, is disposed is sloped so that the external surface of the sloped wall 196 comes progressively closer to the external surface of the bottom wall 20, from the base end side to the distal end side of the retention piece 186. Therefore, the surface of the retention piece 186 disposed on the sloped wall 196 is also sloped so as to come progressively closer to the external surface of the bottom wall 20, from the base end side to the distal end side of the retention piece 186. Therefore, this construction also achieves substantially the same effects as those of the first embodiment, and acquires substantially the same effects as those of the first embodiment.

Besides, in this embodiment, the sliding direction of the rod 126 is also sloped. Furthermore, unlike the retention piece 132, the retention piece 186 is in a flat plate shape, and is lighter in weight than the retention piece 132. Therefore, even if the output of the micro gas generator 122 is small, the retention piece 186 can be slid. Thus, the micro gas generator 122 can be made smaller in size.

Besides, in conjunction with the foregoing embodiments, the materials and the like of the retention pieces 132, 186 are not particularly mentioned. However, it is preferable that the retention pieces 132, 186 have smooth surfaces such that latch rings 134, 136 are readily slid, in light of the issues to be solved by the invention.

Besides, in the foregoing embodiments, the retention pieces 132, 186 have a mere flat plate surface, it is also permissible to dispose a rolling element, such as a roller, a bearing, etc., at a site that contacts the latch rings 134, 136 so as to facilitate the sliding of the latch rings 134, 136.

Furthermore, although in the foregoing embodiments the surfaces of the retention pieces 132, 186 are flat surfaces, the surfaces of the retention pieces 132, 186 may also be curved surfaces.

What is claimed is:

1. An airbag device comprising:
a bag body that inflates and deploys as gas is supplied into the bag body and therefore an internal pressure of the bag body rises;
a linkage member whose first end portion is bound to the bag body and whose second end portion is provided with an annular latch ring;
a retention device that has a retention member capable of penetrating the latch ring, and that retains the second end portion of the linkage member while the latch ring is penetrated by the retention member, and that discontinues retention of the second end portion of the linkage member as the retention member comes out of the latch ring, and that is able to make at least one of a deployed shape of the bag body and the internal pressure of the bag body different, by discontinuing the retention, from a state of the at least one of the deployed shape and the internal pressure brought about while the second end portion of the linkage member is retained; and
a support body that supports the retention device, and that has a general surface,
wherein the retention member is provided at a position opposite to an occupant-side face of the general surface, and that is provided with a slope surface, and
the slope surface slopes and locates on a face opposite to an occupant-side face of the retention member, that slopes so that a distance between the slope surface and the general surface is shorter at a distal end of the retention member than at a site relatively near to the base end of the retention member.

2. The airbag device according to claim 1, further comprising
a slope portion that is interposed between a support body on which the retention device is supported and the retention member which contacts the latch ring and that slopes the retention member relative to the support body.

3. The airbag device according to claim 1, further comprising
a rod that is driven by the retention device,
wherein the retention member is linked to the rod, and extends substantially parallel to a lengthwise direction of the rod.

4. An airbag device comprising:
a bag body that inflates and deploys as gas is supplied into the bag body and therefore an internal pressure of the bag body rises;
a linkage member whose first end portion is bound to the bag body and whose second end portion is provided with a latch stopper hole; and
a retention device that has a retention member which is capable of penetrating the latch stopper hole and that retains the second end portion of the linkage member while the latch stopper hole is penetrated by a distal end of the retention member, and that discontinues retention of the second end portion of the linkage member as the distal end of the retention member comes out of the latch stopper hole, and that is able to make at least one of a deployed shape of the bag body and the internal pressure of the bag body different, by discontinuing the retention, from a state of the at least one of the deployed shape and the internal pressure which is brought about while the second end portion of the linkage member is retained, wherein the retention member is provided with a slope surface, the slope surface contacts with an inner edge of the latch stopper hole at a contact point when a tensile force is applied to the retention member from an inner edge of the latch stopper hole, and an angle that is formed by a line segment connecting the contact point and the first end portion of the linkage member, and a line segment connecting the contact point and a base end of the slope surface, that is an obtuse angle.

5. The airbag device according to claim 4, wherein the slope surface provided on the retention member is sloped so that the distal end of the slope surface is closer to the first end portion of the linkage member than a site on the slope surface relatively near to the base end of the retention member is to the first end portion of the linkage member.

6. The airbag device according to claim 5, further comprising a support body that supports the retention device, and that has a general surface, wherein the retention member is provided at a position opposite to a occupant-side face of the general surface, and is movably secure to the retention device, and wherein the slope surface is sloped so that a distance between the slope surface provided on the retention member and a general surface of the support body is shorter at the distal end of the retention member than at a site relatively near to the base end of the retention member.

7. The airbag device according to claim 4, further comprising a slope portion that is interposed between a support body on which the retention device is supported and the retention member which contacts the latch stopper hole and that slopes the retention member relative to the support body.

8. The airbag device according to claim 4, further comprising a rod that is driven by the retention device, wherein the retention member is linked to the rod, and extends substantially parallel to a lengthwise direction of the rod.

9. An airbag device comprising:

a bag body that inflates and deploys as gas is supplied into the bag body and therefore an internal pressure of the bag body rises;

a linkage member whose first end portion is bound to the bag body and whose second end portion is provided with a latch stopper hole; and a retention device that has a retention member which is capable of penetrating the latch stopper hole and that retains the second end portion of the linkage member while the latch stopper hole is penetrated by a distal end of the retention member, and that discontinues retention of the second end portion of the linkage member as the retention member comes out of the latch stopper hole, and that is able to make at least one of a deployed shape of the bag body and the internal pressure of the bag body different, by discontinuing the retention, from a state of the at least one of the deployed shape and the internal pressure which is brought about while the second end portion of the linkage member is retained, wherein the retention member is provided with a slope surface that transforms a portion of a force that is applied to the retention member from an inner edge of the latch stopper hole provided on the linkage member and pulls the second end portion of the linkage member toward the first end portion of the linkage member into a force that acts in a direction from a site relatively near to a base end of the retention member to the distal end of the retention member.

10. The airbag device according to claim 9, wherein the slope surface provided on the retention member is sloped so that the distal end of the slope surface is closer to the first end portion of the linkage member than a site on the slope surface relatively near to the base end of the retention member is to the first end portion of the linkage member.

11. The airbag device according to claim 10, further comprising a support body that supports the retention device, and that has a general surface, wherein the retention member is provided at a position opposite to an occupant-side face of the general surface, and is movably secure to the retention device, and wherein the slope surface is sloped so that a distance between the slope surface provided on the retention member and a general surface of the support body is shorter at the distal end of the retention member than at a site relatively near to the base end of the retention member.

12. The airbag device according to claim 9, further comprising a slope portion that is interposed between a support body on which the retention device is supported and the retention member which contacts the latch stopper hole and that slopes the retention member relative to the support body.

13. The airbag device according to claim 9, further comprising a rod that is driven by the retention device, wherein the retention member is linked to the rod, and extends substantially parallel to a lengthwise direction of the rod.

* * * * *